Sept. 20, 1971     L. C. GRAVES     3,606,585

FLUID PRESSURE DRIVEN PUMP

Filed Oct. 20, 1969

INVENTOR
LEON C. GRAVES
BY
ATTORNEYS

United States Patent Office 3,606,585
Patented Sept. 20, 1971

3,606,585
FLUID PRESSURE DRIVEN PUMP
Leon C. Graves, P.O. Box 381
Rock Springs, Wyo. 82901
Filed Oct. 20, 1969, Ser. No. 867,504
Int. Cl. F04f 1/06
U.S. Cl. 417—127                             1 Claim

ABSTRACT OF THE DISCLOSURE

A pump for moving liquids wherein the prime mover is pressurized gas acting to force liquid from a vessel. Continuous pumping action is accomplished through the interaction of a float-controlled two-way valve in the pressurized gas supply line and check valves in the liquid lines to control and time the periods and directions of fluid flow through the vessel.

Figure 1:
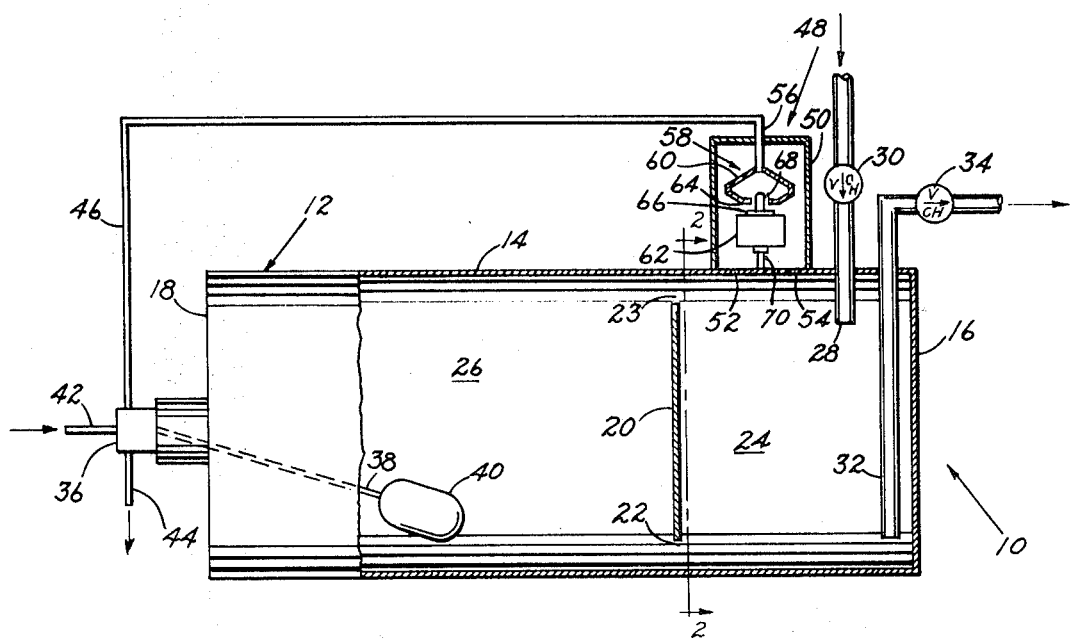

In conventional pumps of the rotary, centrifugal, or impeller types there is always the inherent requirement of maintaining a liquid-tight seal around the input shaft at its entrance into the liquid chamber. In piston type pumps of the double action type, a similar liquid-tight seal is required around the connecting rod where it enters the liquid chamber. If the liquid being pumped has extraordinary physical properties, such as low surface tension, low viscosity or high wetting capabilities, or must be handled at unusually high temperatures or pressures, a long-lived liquid-tight seal is practically impossible to obtain. Under such conditions there is the dual problem of constant maintenance preserving the liquid seals to prevent leakage and the routine periodic replacement of the seals. Added to the above routine maintenance problems are the damaging losses sustained when a seal fails during pump operation.

The present invention solves these sealing requirements by eliminating the necessity for mechanical forcing mechanisms, such as impellers or pistons, within the pump liquid chamber, thereby eliminating the need to transmit mechanical power into the chamber and the resulting requirement to seal around the power shaft or connecting rod. The pump disclosed here effects liquid transfer by admitting the liquid through a check valve into a closed vessel and then introducing pressurized gas to force the liquid from the vessel through the discharge conduit and discharge check valve. The primary operative requirement for the pump is that the inlet liquid be under at least some pressure or under the influence of some hydrostatic head sufficient to force the liquid into the vessel.

During operation of the pump, liquid under a relatively small pressure flows through a check valve and into the pump vessel. As the vessel fills with liquid, any gases remaining therein will be forced out to atmosphere through a two-way float controlled valve. When the liquid from the inlet has nearly filled the vessel, a float, contained therein and controlling the aforementioned two-way valve, is buoyed at its upper position and operates the two-way valve to close the vessel exhaust port and open a valve admitting pressurized gas into the vessel. The gas and liquid pressure in the vessel thus become greater than the liquid inlet pressure and the inlet check valve is forced closed. Also, at this time, the liquid and gas pressure in the vessel is greater than the discharge liquid pressure downstream from the discharge check valve and that check valve is forced open. The liquid contained in the vessel is thus forced out into the discharge line and the float-operated two-way valve remains in a mode to continue to let pressurized gas enter the vessel until nearly all liquid has been discharged. As the vessel is nearly emptied of liquid, the float is carried to its lower position and actuates the two-way valve to shut off the pressurized gas supply and open the vessel to atmosphere. The greater pressure in the downstream discharge line then operates to shut the discharge check valve and the slightly higher inlet liquid pressure operates to reopen the inlet check valve and liquid again flows therefrom into the vessel. The operating cycle is then repeated as above and the pump operates to force transfer the liquid in a pulsed manner. The time required for one cycle, of course, depends on the size of the vessel, the sizes of the inlet, discharge and gas supply lines, the inlet and discharge pressures, and the operating gas pressure. Furthermore, these parameters are mutually dependent on each other and are determined by the conditions under which the pump is to operate.

An effective and efficient application of the pump embodied in the present invention is the circulation of liquids in heat tracing systems around oil and gas well installations. Here the flow characteristics of crude oil is improved by lowering the viscosity of crude as it flows in the lines by tracing the crude lines with heat tracing pipes carrying a hot liquid. It is this hot liquid which can be effectively circulated by the applicant's new pump. The discharge pressure required from the pump is relatively low. There is a residual pressure at the pump's inlet and well head gas is abundantly available to provide the pressurized gas supply.

Therefore, the principal object of this invention is to provide an improved pump for circulating liquids.

The second objective is a provision of a pump in which the requirements of a liquid type seal around a moving part entering the pumping chamber is eliminated.

Another object is to provide a pump in which the mechanical forcing mechanism is not required to be placed in the pumping chamber.

A still further object is to provide a pump which is essentially maintenance free.

Another object is to provide a pump which is compact, versatile, rugged, and inexpensive to manufacture.

Figure 2:
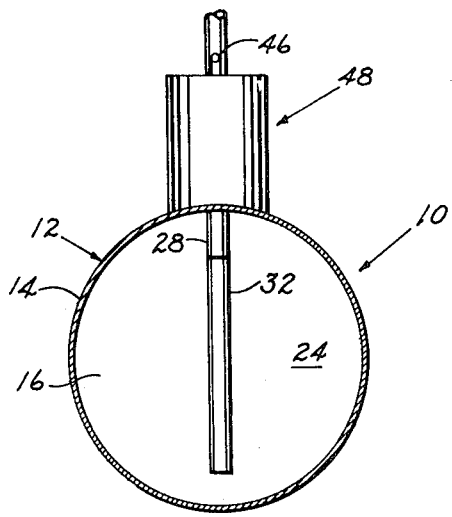

Other objects of this invention will be in part apparent and in part pointed out specifically hereinafter in connection with the description of the drawings that follows and in which:

FIG. 1 is a side view in elevation of a pump of the present invention, portions of the vessel sidewall having been broken away to show a partial section view; and FIG. 2 is an end sectional view taken along line 2—2 of FIG. 1.

As shown in the drawing, consisting of FIGS. 1 and 2, reference numeral 10 generally indicates the complete pumping apparatus of the present invention. In the specific embodiment shown the pump includes a closed fluid-tight pressure vessel 12 with a cylindrical sidewall 14 and end walls 16 and 18. The pressure vessel can be constructed of any suitable material, including steel or aluminum, and the wall thicknesses and specific type of construction will depend on the pressures encountered in particular applications. A baffle plate 20 is mounted inside the vessel generally parallel the two end walls and extending across the vessel between the sidewalls but leaving openings 22 and 23 through the baffle plate at the top and bottom thereof. The vessel is thereby divided into two connected chambers 24 and 26.

A liquid inlet line 28 enters one of the chambers, in this particular embodiment chamber 24, through a sealed connection. Upstream from the connection into the vessel, an inlet check valve 30 is mounted in the inlet line to allow liquid flow through the inlet line into the vessel and to stop or check any outlet flow through this line. The drawing shows the inlet line extending downward into the vessel but such extension is not necessary for pump operation. Also entering the vessel in this same chamber is the liquid outlet line 32 which passes through a sealed connection in the top of the vessel. The outlet line extends downward into the vessel so that its opening is near the bottom thereof. An outlet check valve 34 is mounted in the outlet line downstream from the vessel connection. This outlet check valve permits liquid flow out of the vessel but not flow from the outlet line into the vessel. Although the drawing shows the outlet line entering through the top of the vessel, all that is required for proper operation is that the opening of the line be near the bottom of the vessel.

The second chamber of the vessel, formed at the end opposite the inlet and outlet chamber 24 and separated therefrom by baffle plate 20, is the float control chamber and is indicated by numeral 26 in the drawing. A float-controlled two-way valve 36, of a type well known and existing in the prior art, is mounted on the outside of vessel end wall 18. This valve is actuated by a float control arm 28 pivoted within the valve body for movement in a vertical plane. Float control arm 38 projects into the float control chamber through an opening in the end wall. The two-way valve body is fastened over this end wall opening by a connection which forms a fluid-tight seal between the valve body and the vessel. A float ball 40 is fastened to the end of the float control arm and is buoyed by the liquid in the vessel to determine the position of the control arm.

Float-controlled two-way valve 36 functions to connect one of two fluid lines with a third as controlled by the position of float control arm 38. As used with the present invention one of the valve lines, 42, is connected to the pressurized gas supply source, one line, 44, is an exhaust line, and the third line, 46, is connected into the vessel. The valve is adjusted so that when the control arm is at its lowest position or during its upward movement line 46 connecting into the vessel is connected to the exhaust line 44 and pressurized gas supply line 42 is blocked or shut off. When the control arm reaches its topmost position and during its downward movement, the two-way valve is in a mode connecting line 46 into the vessel with pressurized gas supply line 42 and exhaust line 44 is blocked.

Gas line 46, which connects the two-way valve with the vessel, enters the vessel through a safety valve mechanism generally indicated by 48. The purpose of this safety mechanism is, in the event of a gas supply failure, to prevent any flow of liquid from the vessel into the gas line 46 and subsequently into the two-way valve through gas line 46. The mechanism is contained in a housing 50 which is fastened with a sealed connection to the outside of the vessel. The inside of this housing is in communication with the vessel chambers through openings 52 and 54. Gas line 46 from the two-way valve enters the housing through a sealed connection at 56. The safety valve mechanism consists of a liquid-operative, float check valve 58 contained in the housing and connected to the end of gas line 46 which terminates inside the housing. While any type of float check valve which allows gaseous flow in either direction and will not allow liquid flow into gas line 46 will perform the necessary function, the embodiment shown in the drawing consists of a seating fitting 60 fastened to the end of gas line 46 and a float 62 which is positioned to cooperate with the seating fitting to form the float check valve. The seating fitting is constructed with an annular valve seat 64 on its lower end which will mate an annular seat 66 formed on the top of the float. The float is held in position by an upstanding projection 68 fitting inside the seating fitting annular valve seat and by an upright stop 70 fastened to the outside of the vessel sidewall and sized and positioned to limit the float's vertical movement so that upstanding projection 68 will be retained inside the seating fitting.

In operation of the present invention as a pump, liquid under a relatively small pressure flows through check valve 30 and into the pump vessel chamber 24 and then through opening 22 into chamber 26 also. As the vessel fills with liquid, any gases remaining therein are forced out through openings 52 and 54, through the liquid float check valve 58, into gas line 46, and through the two-way valve 36 to the exhaust outlet 44. During this filling phase the float 40 which controls the two-way valve 36, is being carried upward and the two-way valve is in a mode in which gas line 46 is connected to exhaust line 44 and pressurized gas supply line 42 is blocked. When the liquid has nearly filled the vessel, float 40 is buoyed to its topmost position and switches the two-way valve to the opposite mode wherein the gas line 46 is connected to the pressurized gas supply line 42 and the exhaust line 44 is blocked. The gas from the pressurized supply thus admitted into the vessel through two-way valve 36, gas line 46, safety valve mechanism 48, and openings 52 and 54 increases the gas and liquid pressure in the vessel to a value greater than the inlet pressure. The inlet check valve 30 is thus forced closed and inlet liquid flow ceases. The increased pressure in the vessel is also greater than the pressure in the outlet line so outlet check valve 34 is forced open and the liquid is forced out of the vessel through outlet line 32 and outlet check valve 34. Such outflow continues until float 40 falls with the liquid level to a predetermined low level at which time the float control arm 38 switches the two-way valve back to the original mode. In the original mode the pressurized gas supply is shut off and gas line 46 is connected to the exhaust line 44. The pressure in the vessel is thus rapidly decreased to atmospheric and since the pressure in the liquid outlet line downstream of the outlet check valve is greater than atmospheric, check valve 34 is forced closed. Furthermore, since the pressure in the liquid inlet line upstream from check valve 30 is slightly higher than atmospheric, check valve 30 is again opened allowing inlet liquid flow into the vessel to begin another pumping cycle.

The safety valve mechanism 48 will only come into operation if there is a failure in either the switching of the two-way valve or the pressurized gas supply system. If either of these two failures occurred, there would be nothing to stop the inflow of liquid until the vessel was filled and liquid forced the float 62 upward to seal with the seating fitting 60. Then the vessel would be completely sealed and inlet flow would cease, in effect shutting down the pump until the failure is rectified.

The pump disclosed in the foregoing specification and drawing operates to produce a pulsating outlet flow in which both the rate of pulses and quantity of flow are determined by the gas supply, inlet liquid, and discharge liquid pressures and by the line and vessel dimensions.

What is claimed is:

1. The fluid pressure driven pump comprising: a fluid tight pressure vessel; a first liquid conduit into said vessel; a second liquid conduit into said vessel; a first check valve in said first liquid conduit adapted to allow unidirectional fluid flow into said vessel through said first liquid conduit; a second check valve in said second liquid conduit adapted to allow unidirectional fluid flow out of said vessel through said second liquid conduit; a liquid level responsive valve means having first and second modes of operation, said first mode adapted to open said vessel to an exhaust environment and said second mode adapted to close said vessel to said exhaust environment and connect same to a pressurized fluid supply source, said liquid level responsive valve means comprised of a two-way valve, a first fluid conduit connected from said two-way valve's common connection into said vessel, a second fluid conduit connected from said two-way valve's output connection to an exhaust environment, a third fluid conduit connected from the said two-way valve's input connection to a pressurized fluid supply source, the said two-way valve operative to interconnect said first, second, and third fluid conduits to effect either said first or second modes of operation; a vessel liquid level sensing means adapted to switch said liquid level responsive valve means to said first operative mode when vessel liquid level is at a pre-selected low level and rising, said low level selected higher than the opening of said second conduit into said vessel, and to said second operative mode when vessel liquid level is at a pre-selected high level and falling; and a liquid check valve connected in said first fluid conduit between the vessel and said two-way valve, said liquid check valve connected and adapted to prevent liquid flow from the vessel to said two-way valve but allow gas flow into or out of the vessel.

References Cited
UNITED STATES PATENTS

| | | | |
|---|---|---|---|
| 1,544,916 | 7/1925 | Ludeman | 417—131 |
| 1,702,273 | 2/1929 | Savage | 417—134 |
| 2,141,427 | 12/1938 | Bryant | 417—148 |
| 2,237,246 | 4/1941 | Askin | 137—574X |

CARLTON R. CROYLE, Primary Examiner

R. E. GLUCK, Assistant Examiner

U.S. Cl. X.R.

417—130